(12) United States Patent
Caveney

(10) Patent No.: US 8,319,120 B2
(45) Date of Patent: Nov. 27, 2012

(54) COMPACT SPILLOVER FITTING AND METHOD OF USE THEREOF

(75) Inventor: Jack Caveney, North Palm Beach, FL (US)

(73) Assignee: Panduit Corp., Tinley Park, IL (US)

( * ) Notice: Subject to any disclaimer, the term of this patent is extended or adjusted under 35 U.S.C. 154(b) by 217 days.

(21) Appl. No.: 12/908,472

(22) Filed: Oct. 20, 2010

(65) Prior Publication Data

US 2011/0030992 A1   Feb. 10, 2011

Related U.S. Application Data

(63) Continuation of application No. 12/194,223, filed on Aug. 19, 2008, now Pat. No. 7,825,342.

(60) Provisional application No. 60/956,733, filed on Aug. 20, 2007.

(51) Int. Cl.
*H02G 3/04* (2006.01)

(52) U.S. Cl. ............ 174/481; 174/72 A; 174/68.3; 174/101; 385/136; 439/207

(58) Field of Classification Search .......... 174/480, 174/481, 72 A, 95, 96, 101, 68.3; 439/207; 385/136; 248/205.1; 312/406

See application file for complete search history.

(56) References Cited

U.S. PATENT DOCUMENTS

| | | | |
|---|---|---|---|
| 4,163,572 A | 8/1979 | Benscoter | |
| 4,366,341 A | 12/1982 | Van Riet | |
| 4,372,511 A | 2/1983 | Knowles | |
| 4,860,168 A | 8/1989 | Wiljanen et al. | |
| 4,926,009 A | 5/1990 | Van Leeuwen | |
| 5,316,244 A | 5/1994 | Zetena, Jr. | |
| 5,399,814 A | 3/1995 | Staber et al. | |
| 5,872,336 A | 2/1999 | Long | |
| 5,929,380 A | 7/1999 | Carlson, Jr. et al. | |
| 5,937,131 A | 8/1999 | Haataja et al. | |
| 6,044,194 A | 3/2000 | Meyerhoefer | |
| 6,192,181 B1 | 2/2001 | Haataja et al. | |
| 6,522,823 B1 * | 2/2003 | Wentworth et al. | 385/134 |
| 6,535,683 B1 | 3/2003 | Johnson et al. | |
| 6,597,854 B2 | 7/2003 | Haataja et al. | |
| 6,633,718 B1 | 10/2003 | Thorn | |
| 6,868,220 B2 | 3/2005 | Haataja et al. | |
| 6,925,242 B2 | 8/2005 | Haataja et al. | |
| 7,167,625 B2 | 1/2007 | Haataja et al. | |
| 2007/0253672 A1 | 11/2007 | Haataja et al. | |
| 2008/0199141 A1 | 8/2008 | Haataja et al. | |

FOREIGN PATENT DOCUMENTS

DE    3742448 A1    6/1989

OTHER PUBLICATIONS

Panduit Pan-Net Network Solutions catalog cover page, pp. C3.1-C3.3; C3.9-C3.11; and back cover, Jul. 2007.

* cited by examiner

*Primary Examiner* — Dhirubhai R Patel
(74) *Attorney, Agent, or Firm* — Robert A. McCann; Christopher S. Clancy

(57) ABSTRACT

A spillover fitting is positioned on an upstanding side of a lateral cable trough. The spillover fitting includes a first exit path having a first curved surface that extends at least partially over a base of the lateral cable trough, and a bottom wall having a second curved surface intersecting with the first curved surface. The first surface curves upward relative to the base of the lateral cable trough and defines a top surface of a cable path, and the second surface is convexly curved and defines a bottom surface of the cable path. The radius of curvature of the first curved surface is equal to the radius of curvature of the second curved surface.

6 Claims, 7 Drawing Sheets

COMPACT SPILLOVER FITTING AND METHOD OF USE THEREOF

CROSS REFERENCE TO RELATED APPLICATION

This application is a continuation of U.S. patent application Ser. No. 12/194,223, filed Aug. 19, 2008, which issued as U.S. Pat. No. 7,825,342 on Nov. 2, 2010, which claims priority from U.S. Provisional Patent Application Ser. No. 60/956,733, filed Aug. 20, 2007, the entire disclosure of which is hereby incorporated by reference.

FIELD OF THE INVENTION

The present invention relates generally to cable management and, more particularly, to a compact spillover fitting and a method of using a compact spillover fitting, for use in field applications, such as installations using raceways, troughs or other cable management apparatus.

BACKGROUND OF THE INVENTION

FIGS. 1A through 1C illustrate various views of a prior art spillover fitting. As shown in FIGS. 1A-1C, the spillover fitting 10 includes a curved bottom surface 12 that extends from a downwardly projecting sidewall 14. The downwardly projecting sidewall 14 mounts along the inside surface of a lateral trough (not shown). On each side of the curved bottom surface 12, the spillover fitting 10 has a curved sidewall 16. The curved sidewalls 16 terminate at an edge 18 that is aligned with the downwardly projecting sidewall 14. The spillover fitting 10 also includes two lead-ins 20, which are defined by a portion of the downwardly projecting sidewall 14, a curved top surface 22, and a downwardly depending flange 24. The curved surfaces of the spillover fitting 10 provide some degree of bend radius control. The spillover fitting of FIGS. 1A through 1C is further described in U.S. Pat. No. 6,925,242.

FIG. 2 illustrates another known cable exit guiding device 26. The guiding device 26 includes an element 27 that extends into the lateral cable trough and likewise provides curved surfaces 28 for bend radius control. The cable exit guiding device 26 of FIG. 2 is further described in U.S. Pat. No. 5,872,336.

There are disadvantages associated with the known types of spillover fittings. To the extent that known spillover fittings extend into the volume of the lateral trough, such known spillover fittings reduce the capacity of the lateral trough. Size is another disadvantage of known spillover fittings. Size affects not only cost (due to cost of materials), but also the ability to install multiple spillovers for high-density applications, and the amount of smoke generated in the event of a fire. It would therefore be desirable to have an improved spillover fitting.

SUMMARY OF THE INVENTION

A spillover fitting is positioned on an upstanding side of a lateral cable trough. The spillover fitting includes a first exit path having a first curved surface that extends at least partially over a base of the lateral cable trough. Preferably, a bottom portion of the first curved surface is located at the top of the upstanding side of the lateral cable trough. The spillover fitting also includes a bottom wall having a second curved surface intersecting with the first curved surface. The first surface curves upward relative to the base of the lateral cable trough and defines a top surface of a cable path, and the second surface is convexly curved and defines a bottom surface of the cable path. The radius of curvature of the first curved surface is equal to the radius of curvature of the second curved surface. Preferably, the first and second radiuses of curvature are equal to a specified minimum bend radius of a cable.

Preferably, the spillover fitting also includes at least one containment member extending from the first curved surface. The containment member is located outside of a volume of the lateral cable trough.

Preferably, the spillover fitting also includes two parallel opposing sidewalls extending from the second curved surface, and the second curved surface provides up to a 180 degree transition to guide cable in a direction perpendicular to the lateral cable trough.

Preferably, the second exit path is located across the bottom wall from the first exit path.

Preferably, the spillover fitting also includes two alignment tabs contacting the upstanding side of the lateral cable trough, and the alignment tabs are the only part of the spillover fitting extending into a volume of the lateral cable trough.

Preferably, the spillover fitting also includes a mounting bracket located on an underside of the spillover fitting, and the overall length of the spillover fitting is 6 inches.

DETAILED DESCRIPTION OF THE PRESENTLY PREFERRED EMBODIMENTS

Figure 3:
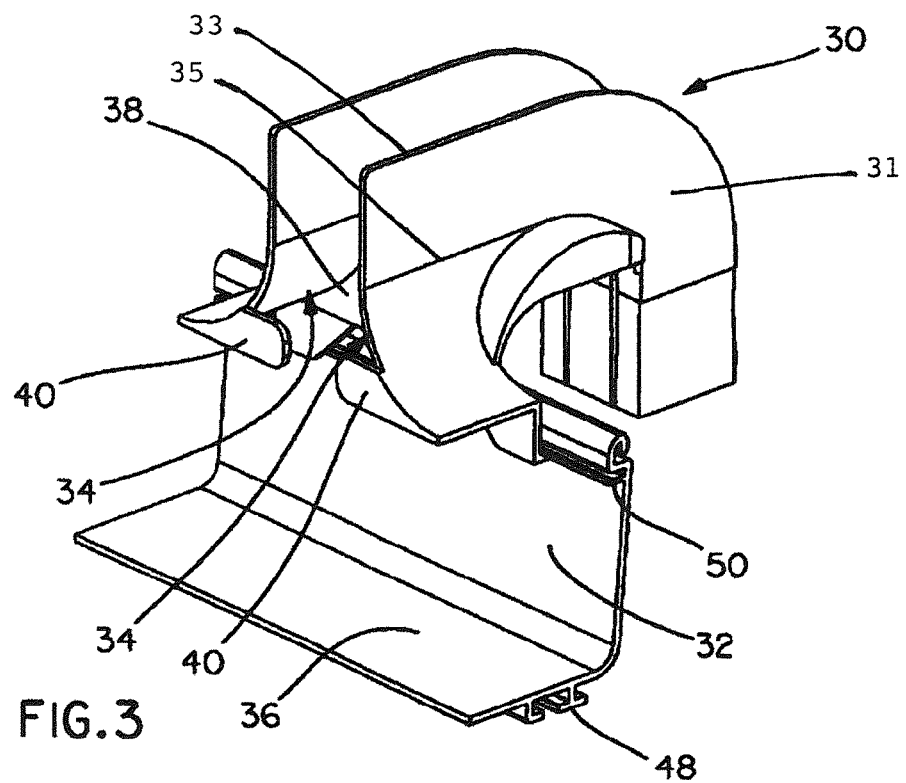
FIG. 3 is a perspective view of a spillover fitting in accordance with a preferred embodiment and a section of a lateral trough.

FIG. 3 shows a compact spillover fitting 30 in accordance with an embodiment of the invention and a portion (bottom and one side wall) of a lateral trough 32. The spillover fitting 30 includes a fitting wall 31 having a top 33 and a bottom 35. The compact spillover fitting 30 has exit paths for cables or wiring. In a preferred embodiment, all of the exit paths in the compact spillover fitting 30 are defined by curved surfaces. A first surface 34 is located at least partially over the base 36 of the lateral trough 32. The first surface 34 is curved upward, relative to the base 36 of the lateral trough 32, to define a top surface for the exit paths. The first surface 34 provides up to a ninety degree transition to guide any cable or wiring that is lifted from the lateral trough 32. A second surface 38 is located adjacent to the lateral trough 32, where it intersects with the first surface 34, and it extends away from the lateral trough 32. The second surface 38 curves convexly to provide up to a one hundred and eighty degree transition to guide cable or wire in a direction that is perpendicular to the lateral trough 32. The second surface 38 defines a bottom surface for the exit paths.

The first surface 34 and the second surface 38 may have the same radius of curvature. Regardless of whether the first surface 34 and the second surface 38 have the same radius of curvature or not, the minimum radius of curvature for the first surface 34 and the second surface 38 is preferably no less than a specified minimum bend radius of a cable.

The compact spillover fitting 30 also includes two straight, finger-like containment members 40. The containment members 40 project inward from an edge of the first surface 34 and may be used to keep cable from falling out of the compact spillover fitting 30.

Figure 4:
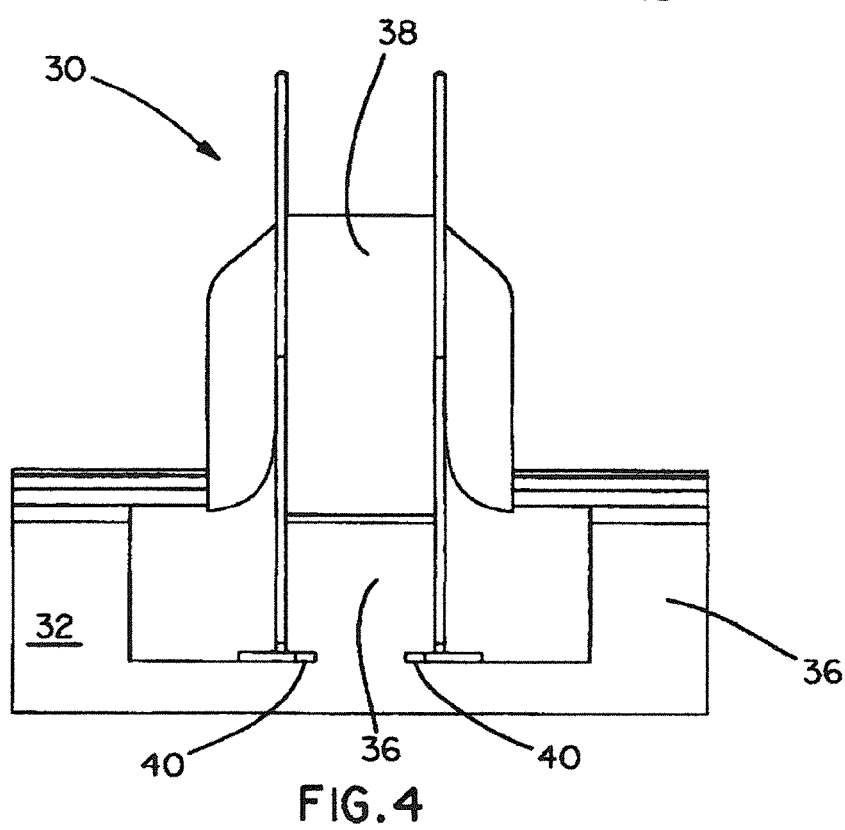
FIG. 4 is a top view of the spillover fitting and the section of the lateral trough shown in FIG. 3.

FIG. 4 is a top view of the spillover fitting 30 and the section of the lateral trough 32 shown in FIG. 3.

Figure 1A:
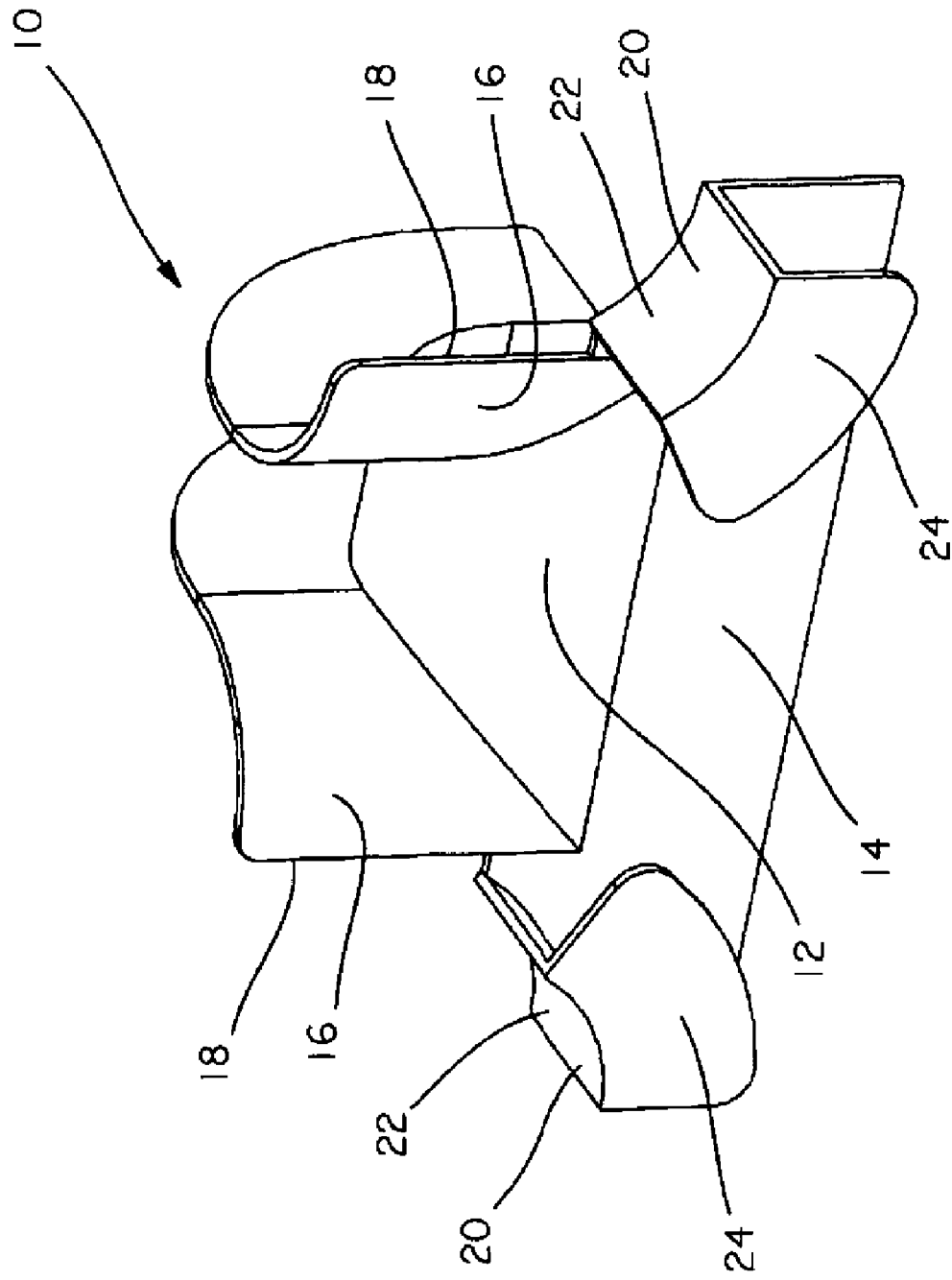
FIGS. 1A-1C illustrate various views of a prior art spillover fitting.
Figure 1B:
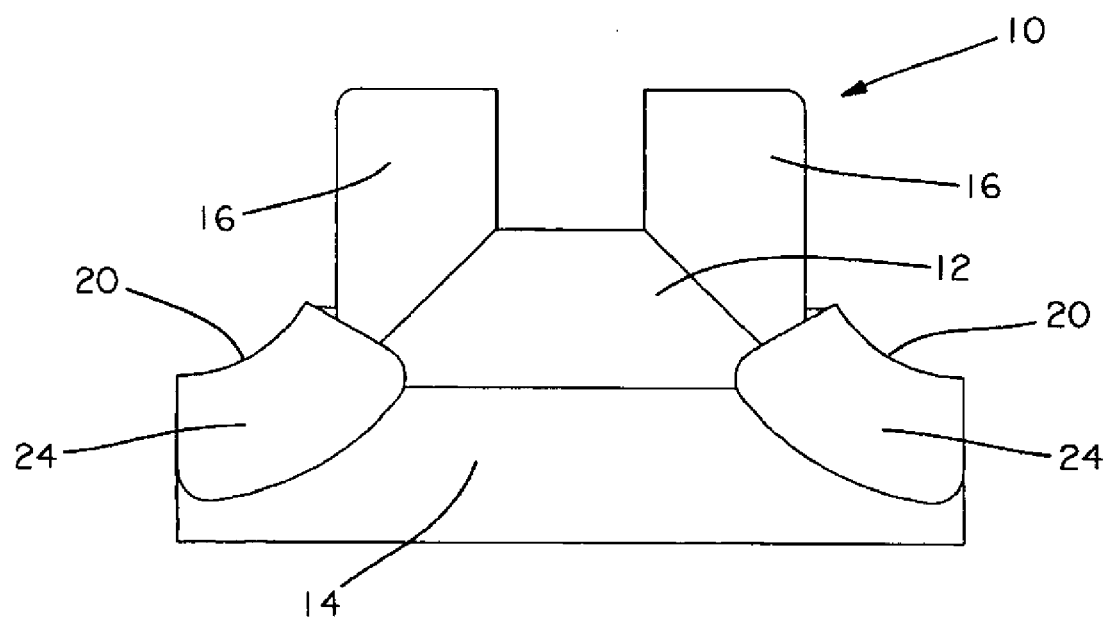
Figure 1C:
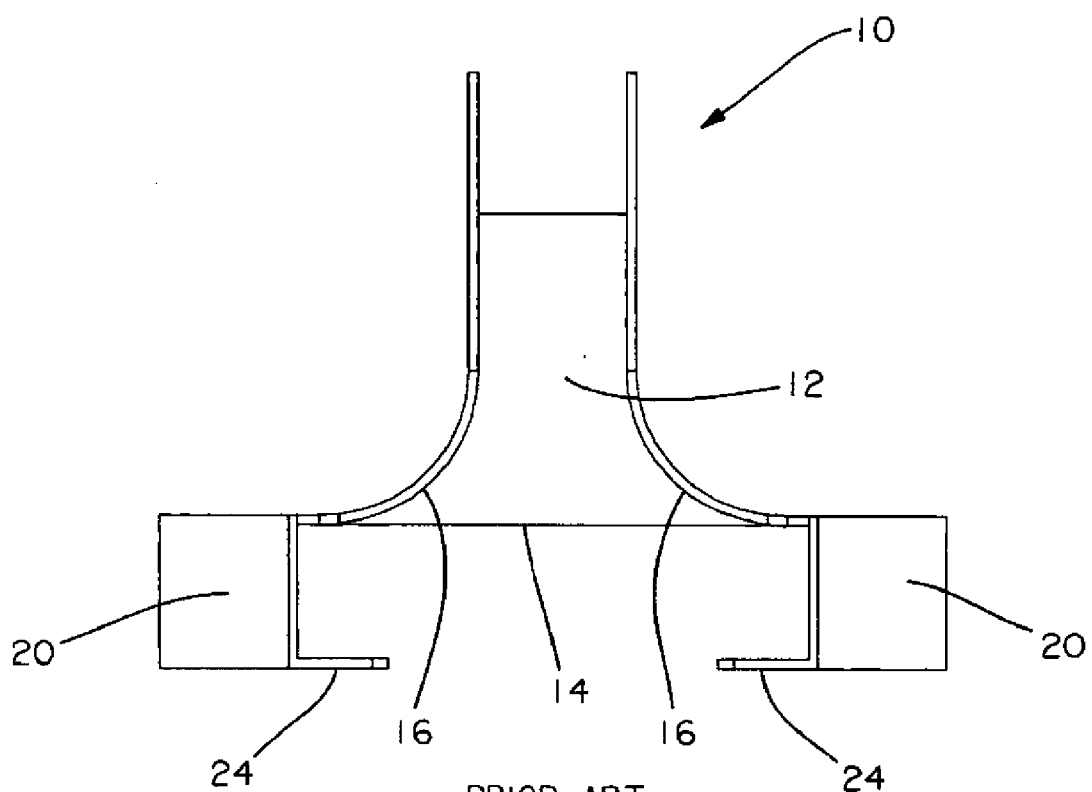
Figure 2:
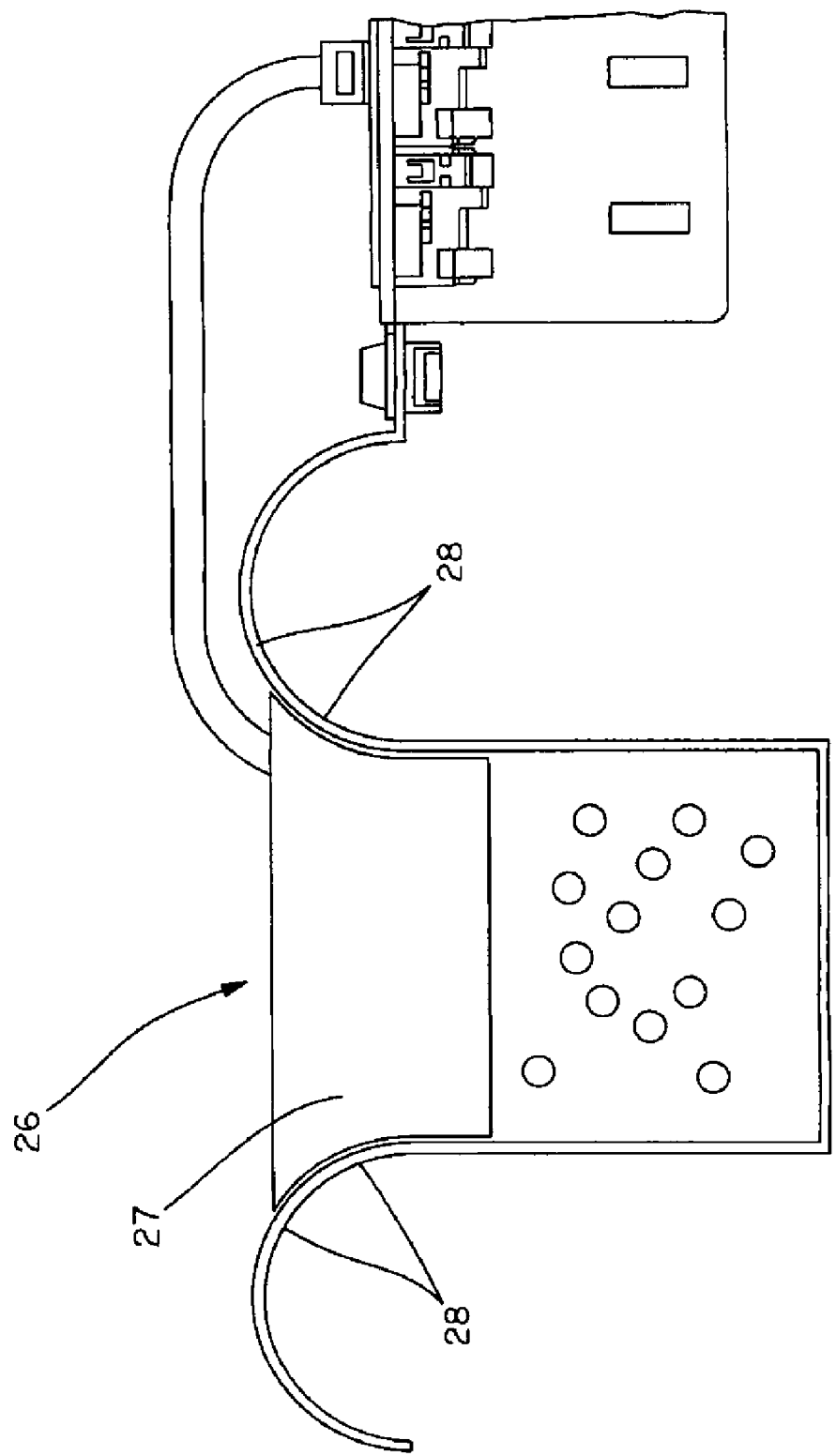
FIG. 2 illustrates another prior art spillover fitting.
Figure 5:
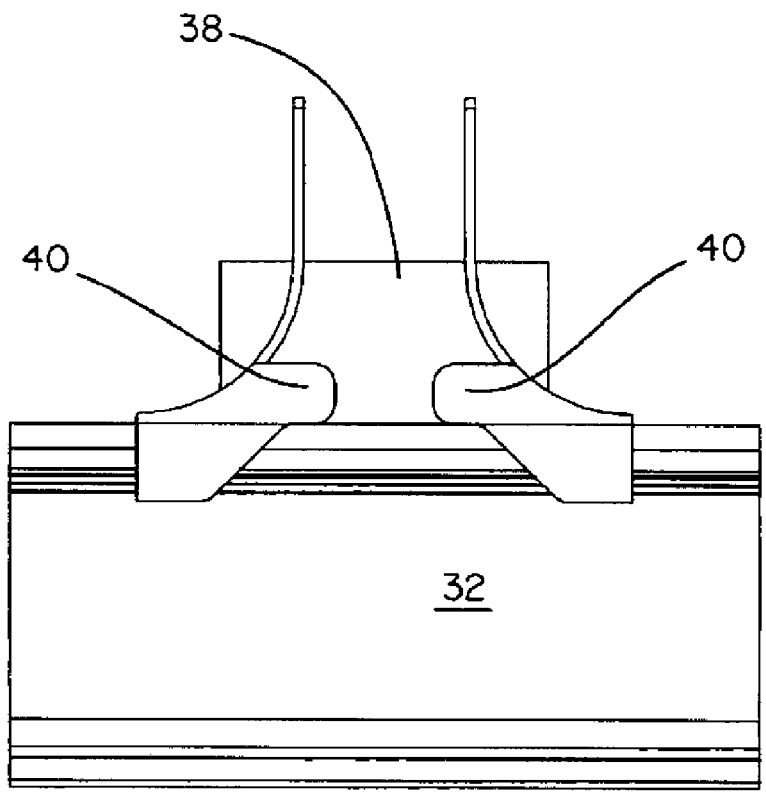
FIG. 5 is a front view of the spillover fitting and the section of the lateral trough shown in FIG. 3.

FIG. 5 is a front view of the spillover fitting 30 and the section of the lateral trough 32 shown in FIG. 3. FIG. 5 also includes measurements of a preferred embodiment of the compact spillover fitting 30. In this embodiment, the overall length of the compact spillover fitting 30 is 6 inches and the minimum cable bend radius is 2 inches. For purposes of comparison, the prior art spillover fitting represented by FIG. 1B has an overall length of 9.9 inches and the minimum cable bend radius is 2 inches. It is an advantage of the compact spillover fitting 30 that it is significantly smaller in size, while still providing cable exit paths with the same minimum cable bend radius. It is a further advantage of the compact spillover fitting 30 that it utilizes very little of the volume within the lateral trough 32 so that it does not significantly affect the capacity of the lateral trough 32.

Figure 6:
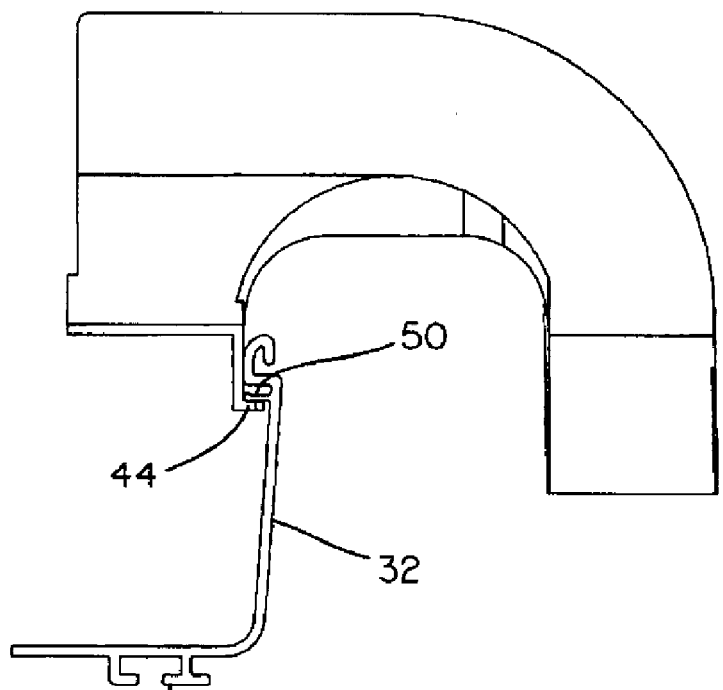
FIG. 6 is a side view of the spillover fitting and the section of the lateral trough shown in FIG. 3.

FIG. 6 is a side view of the spillover fitting 30 and the section of the lateral trough 32 shown in FIG. 3.

Figure 7:
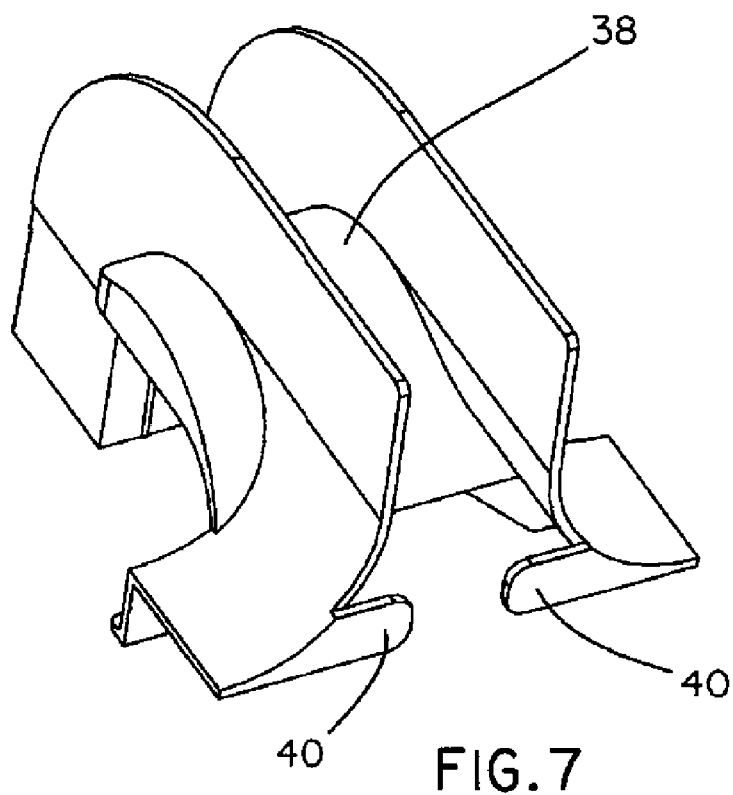
FIG. 7 is a front isometric view of the spillover fitting shown in FIG. 3.

FIG. 7 is a front isometric view of the spillover fitting 30 shown in FIG. 3.

Figure 8:
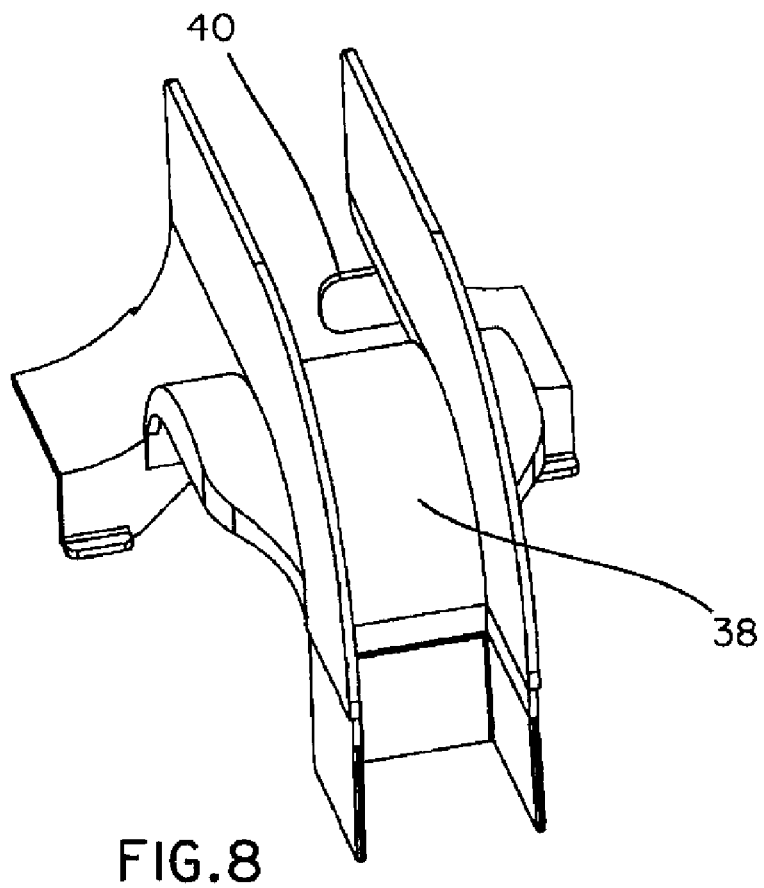
FIG. 8 is a rear isometric view of the spillover fitting shown in FIG. 3.

FIG. 8 is a rear isometric view of the spillover fitting 30 shown in FIG. 3.

Figure 9A:
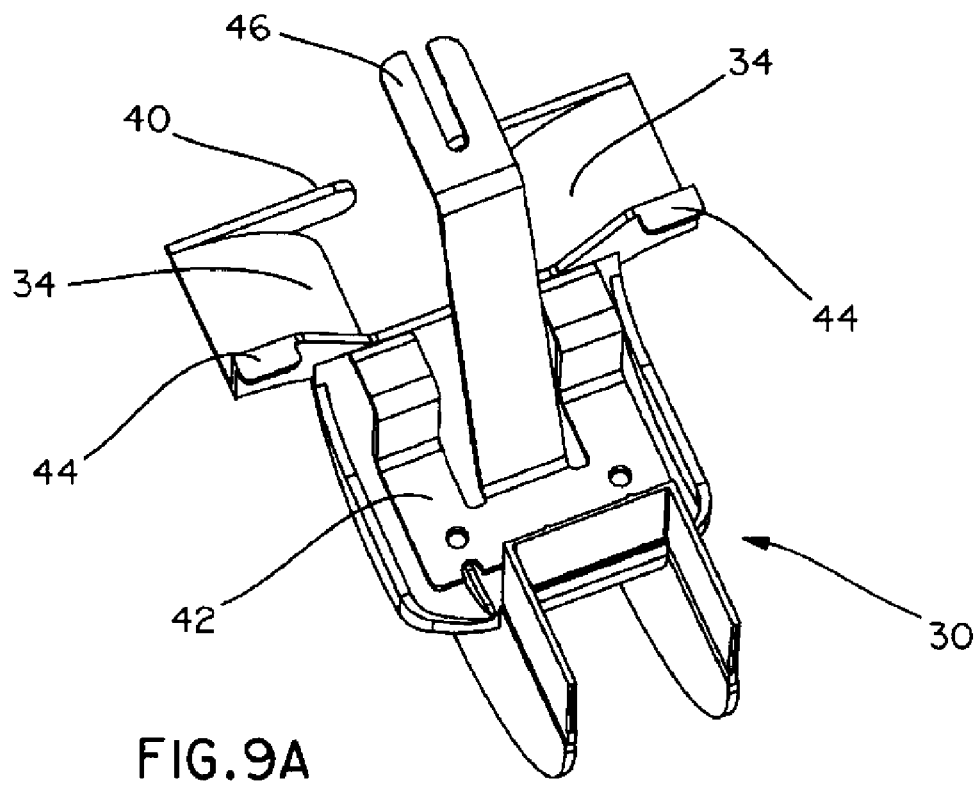
FIGS. 9A and 9B are underside isometric views of the spillover fitting shown in FIG. 3.
Figure 9B:
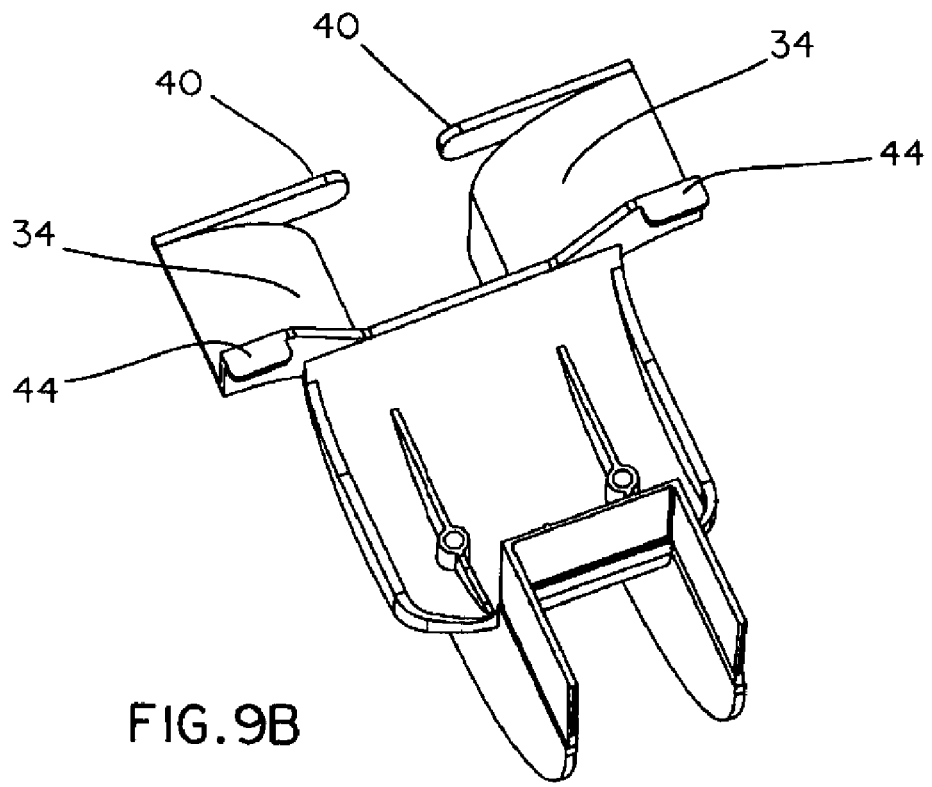

FIGS. 9A and 9B are underside isometric views of the spillover fitting 30 shown in FIG. 3. In FIG. 9A, a mounting bracket 42 is shown on the underside of the compact spillover fitting 30. The mounting bracket 42 has a slotted end 46. A fastener (not shown) may be used to secure the compact spillover fitting 30 to the lateral trough 32 by aligning the slotted end 46 with the mounting rail 48 (shown in FIGS. 3 and 6) on the underside of the lateral trough 32. When secured in this manner, the alignment tabs 44 fit below the projection 50 on the sidewall of the lateral trough 32. The tabs 44 prevent cables from inadvertently being removed from lateral trough 32.

It should be understood that the illustrated embodiments are examples only and should not be taken as limiting the scope of the present invention.

The invention claimed is:

1. A spillover fitting for routing cables from a lateral trough, the spillover fitting comprising:
   a fitting wall having a top and a bottom; and
   a curved lead-in wall extending from the bottom of the fitting wall and configured to be positioned over and adjacent to the lateral trough when the spillover fitting is installed on the lateral trough; and
   a curved floor including an apex of curvature;
   wherein the lead-in wall begins to curve downwardly from the fitting wall at the apex of curvature of the floor.

2. The spillover fitting of claim 1, wherein the intersection of the lead-in wall and the floor is a twisted curve.

3. The spillover fitting of claim 1, further comprising:
   another fitting wall substantially parallel to the fitting wall; and
   another curved lead-in wall that begins to curve downwardly from the other fitting wall at the apex of curvature of the floor.

4. A spillover fitting for routing cables from a lateral trough having a trough wall, the spillover fitting comprising:
   a fitting wall having a top and a bottom; and
   a curved lead-in wall extending from the bottom of the fitting wall and configured to be positioned over and adjacent to the lateral trough when the spillover fitting is installed on the lateral trough; and
   a curved floor adjacent to a portion of the fitting wall and configured to guide the cables over the trough wall, a highest point of the floor being positioned below at least a part of the fitting wall, the lead-in wall intersecting the floor.

5. The spillover fitting of claim 4, wherein the intersection of the lead-in wall and the floor is a twisted curve.

6. The spillover fitting of claim 4, further comprising:
   another fitting wall; and
   another curved lead-in wall extending from a bottom of the other fitting wall to intersect the curved floor and configured to be positioned over and adjacent to the lateral trough when the spillover fitting is installed on the lateral trough.

\* \* \* \* \*